US012438278B2

(12) United States Patent
Somersalo

(10) Patent No.: US 12,438,278 B2
(45) Date of Patent: Oct. 7, 2025

(54) ENHANCED ANTENNA MODULE AND ANTENNA ARRAY FOR WIRELESS COMMUNICATION SYSTEMS

(71) Applicant: Teknologian tutkimuskeskus VTT Oy, Espoo (FI)

(72) Inventor: Matti Somersalo, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 183 days.

(21) Appl. No.: 18/271,247

(22) PCT Filed: Jan. 5, 2022

(86) PCT No.: PCT/FI2022/050013
§ 371 (c)(1),
(2) Date: Jul. 7, 2023

(87) PCT Pub. No.: WO2022/148909
PCT Pub. Date: Jul. 14, 2022

(65) Prior Publication Data
US 2024/0063547 A1 Feb. 22, 2024

(30) Foreign Application Priority Data
Jan. 8, 2021 (FI) ..................................... 20215020

(51) Int. Cl.
*H01Q 9/28* (2006.01)
*H01Q 21/00* (2006.01)
(Continued)

(52) U.S. Cl.
CPC ............... *H01Q 9/28* (2013.01); *H01Q 21/24* (2013.01); *H01P 1/00* (2013.01)

(58) Field of Classification Search
CPC .......... H01P 1/00; H01Q 21/00; H01Q 21/06; H01Q 21/24; H01Q 5/48; H01Q 9/28; H01Q 9/285
See application file for complete search history.

(56) References Cited

U.S. PATENT DOCUMENTS 6,400,332 B1 * 6/2002 Tsai ........................ H01Q 9/285 343/700 MS
6,822,618 B2 * 11/2004 Bisiules ................... H01Q 5/42 343/793

(Continued)

FOREIGN PATENT DOCUMENTS

CN 106229645 A 12/2016
JP 2009100253 A 5/2009
JP 2009124403 A 6/2009

OTHER PUBLICATIONS

Amadjikpe et al: Highly Directive Package-Integrated Dipole Arrays for Low-Cost 60-GHz Front End Modules. IEEE MTT-S International Microwave Symposium, May 23, 2010, pp. 348-351.

(Continued)

*Primary Examiner* — Tho G Phan
(74) *Attorney, Agent, or Firm* — Laine IP Oy

(57) ABSTRACT

According to an example aspect of the present invention, there is provided an antenna module comprising a Radio Frequency, RF, component electrical connection platform, a dipole antenna on top of, or buried in, the platform, wherein the dipole antenna is arranged to transmit and/or receive an RF signal and a distance between a ground at a bottom of the platform and arms of the dipole antenna is about a quarter of a wavelength of the RF signal and a pair of via holes comprising a first via hole and a second via hole extending through the platform, from the ground of the platform to the arms of the dipole antenna, wherein the first via hole is coupled to an RF feed and to a first arm of the dipole antenna (Continued)

and the second via hole is coupled to the ground at the bottom of the platform and to a second arm of the dipole antenna.

15 Claims, 12 Drawing Sheets

(51) Int. Cl.

| | |
|---|---|
| ***H01Q 21/24*** | (2006.01) |
| *H01P 1/00* | (2006.01) |

(56) References Cited

U.S. PATENT DOCUMENTS 7,053,852 B2 * 5/2006 Timofeev ............... H01Q 21/08 343/793
7,113,141 B2 * 9/2006 Almog ..................... H01Q 1/36 343/795
7,501,991 B2 * 3/2009 Yeap ........................ H01Q 9/26 343/700 MS
8,289,218 B2 * 10/2012 Payne ...................... H01Q 9/28 343/797
8,810,467 B2 * 8/2014 Lee ........................ H01Q 13/10 343/817
11,417,945 B2 * 8/2022 Kasani ............... H01Q 21/0075
2012/0146869 A1 6/2012 Holland et al.
2016/0022165 A1 1/2016 Sackellares et al.
2018/0040955 A1 2/2018 Vouvakis et al.

OTHER PUBLICATIONS

Hall et al: Sequentially rotated arrays with reduced sidelobe levels. Electronics Letters, IEE Stevenage, GB, Aug. 27, 1992, vol. 28, No. 18, pp. 1761-1763.

Smith: Grating lobes of sequentially rotated antenna arrays. Antennas and Propagation, 1991, ICAP 91., Seventh International Conference on (IEE) York, UK, London, UK, IEE, UK, Jan. 1, 1991, pp. 217-220.

* cited by examiner

ENHANCED ANTENNA MODULE AND ANTENNA ARRAY FOR WIRELESS COMMUNICATION SYSTEMS

FIELD

Embodiments of the present invention relate in general to an enhanced antenna module and antenna array for wireless communication systems.

BACKGROUND

Utilization of smart antenna array solutions is increasing rapidly in various wireless communication systems such as 5G networks, Wireless Local Area Networks, WLANs, and satellite communication networks. For example, massive Multiple-Input Multiple-Output, MIMO, systems may be used in 5G/NR base stations. Obviously, antenna solutions should not be too complex, heavy or expensive. It is also desirable to have antenna solutions that are not too complicated to manufacture. Scarcity of available frequency spectrum is an issue as well for various wireless communication networks and hence it is important to use the limited radio resources as effectively as possible to provide sufficient communication capacity.

In general, millimetre-wave signals refer to a frequency range from about 30 to about 300 GHz, i.e., signals having a wavelength from 10 to 1 millimetre. At this frequency range antenna structures with radiating elements and ground plane phasing comparable to a quarter wavelength may be manufactured on a Printed Circuit Board, PCB, though manufacturing complex structures may be challenging when narrow lines and gaps become too small to be produced using standard PCB technology. At low frequencies, say sub 6 GHz 5G bands, other manufacturing methods than standard PCB process may be used.

SUMMARY OF THE INVENTION

According to some aspects, there is provided the subject-matter of the independent claims. Some embodiments are defined in the dependent claims.

According to a first aspect of the present invention, there is provided an antenna module comprising a Radio Frequency, RF, component electrical connection platform, a dipole antenna on top of, or buried in, the platform, wherein the dipole antenna is arranged to transmit and/or receive an RF signal. The distance between a ground at a bottom of the platform and arms of the dipole antenna is about a quarter of a wavelength of the RF signal. The antenna module further comprises a pair of via holes comprising a first via hole and a second via hole extend through the platform, from the ground of the platform to the arms of the dipole antenna. The first via hole is coupled to an RF feed and to a first arm of the dipole antenna and the second via hole is coupled to the ground at the bottom of the platform and to a second arm of the dipole antenna. The RF signal may be a millimetre wave signal for example.

According to a second aspect of the present invention, there is provided an antenna array comprising multiple antenna modules according to the first aspect.

According to a third aspect of the present invention, there is provided a wireless device, such as a base station, an access point, a relay, a satellite or a wireless terminal like a user equipment, comprising the antenna array of the second aspect.

EMBODIMENTS

Figure 1:
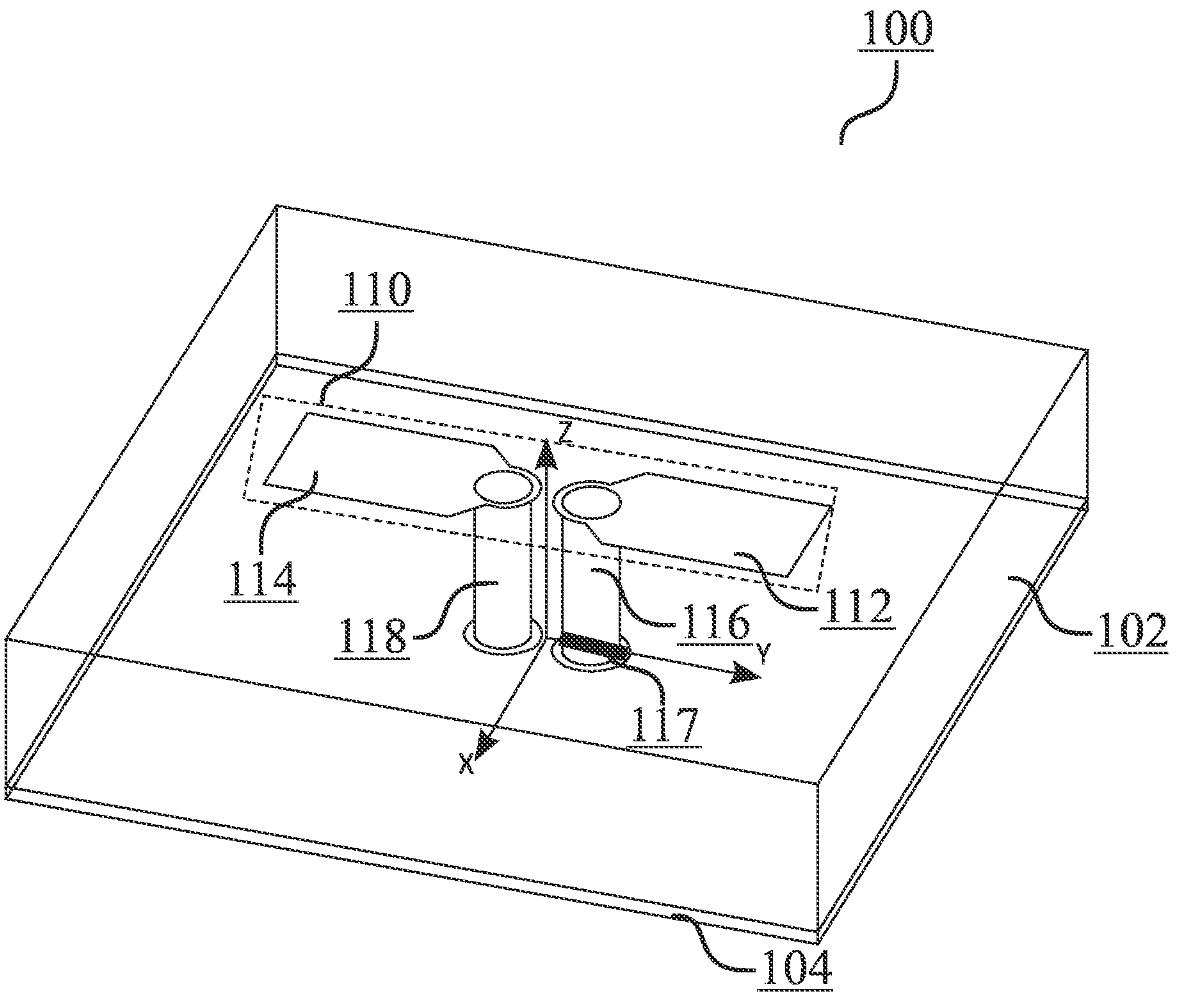
FIG. 1 illustrates a first example of an antenna module in accordance with at least some embodiments of the present invention.

Embodiments of the present invention relate to an antenna module and an antenna array for transmitting/receiving Radio Frequency, RF, signals, such as millimetre-wave signals. More specifically, in some embodiments, at simplest, the antenna module comprises an RF component electrical connection platform, such as a Printed Circuit Board, PCB, a radiating dipole antenna, a pair of via holes, ground plane and antenna feed. The dipole antenna may be manufactured on the top of the platform. One dipole arm may be connected electrically with a via hole to the antenna feed at the bottom of the platform while the other arm is connected electrically with another via hole directly to antenna ground.

The dimensions of the pair of via holes, used as an antenna feed, are important for proper operation. Via hole length defines the distance between the arms of the dipole antenna and ground metal to be about a quarter wavelength inside the platform, as at this length the grounded antenna module sees high impedance against the ground. Horizontal distance between the via holes and the diameter further define the feed impedance. Thus the pair of via holes is arranged to work as a balanced feed and as a balun, and as an impedance transformer for the dipole antenna about a quarter wavelength of an RF signal, like a millimetre-wave signal, above ground.

The antenna module is compact, cheap and easy to manufacture, especially standard PCB manufacturing processes can be used. No special structures, like cavities, metal walls etc., are needed for the antenna module. As the pair of via holes goes through the dipole antenna spacing substrate, i.e., through the substrate layer between the antenna module and the bottom layer, the via holes may be done by drilling the holes with a laser for example, thereby making manufacturing easy. If the platform has a stacked multi-level structure, the drilling of small via holes becomes even easier.

The antenna module may also comprise another pair of via holes for another dipole antenna forming a crossed dipole structure, where the dipole antennas can be used alternatively as a dual linear polarized set of isolated dipole antennas or in circular polarization mode by providing the two dipole antennas with 90 degree phase shift. According to some embodiments of the present invention, this phase shift may be achieved using antenna module integrated phase shifters. Two solutions are introduced for the phase shifter.

In some embodiments, two types of circularly polarized crossed dipole antennas are presented for millimetre-wave signals. The antenna module may comprise two dipole antennas and have two separate ports with 90 degree phase shift, e.g., for left and right hand circular polarizations. Both of the dipole antennas may be printed on top of, or buried in (i.e. on an inner layer of the PCB stack), the platform while a bottom of the platform acts as an antenna ground reflector. Both dipole antennas may comprise a pair of via-holes which form a balanced feed line to the dipole antennas.

FIG. 1 illustrates a first example of an antenna module in accordance with at least some embodiments of the present invention. Antenna module (100) comprises the RF component electrical connection platform (102) for electric connection of RF components and antenna ground at the bottom and a horizontal dipole antenna (110) on top of, or buried in, the platform (102), wherein a distance between a bottom (104) of the platform (102) and the dipole antenna (110) is about a quarter of a wavelength of an RF signal, like a millimetre signal, inside the platform substrate.

If the dipole antenna is buried inside the structure, for example in a layer under the top layer of the stack, the advantage is that the top layer protects the dipole antenna (110) from weathering, making the dipole antenna (110) invisible. Top layer thickness may be used as a design parameter in matching the dipole antenna (110) for a desired operation band. Thus, the dipole antenna may be buried to the platform (102) and the antenna module (100) may further comprise a dielectric layer above the dipole antenna (110), the substrate layer being arranged to be used as a radome protecting the dipole antenna (110) from environmental corrosion, to hide the dipole antenna (110) under protective surface and to be used as an impedance matching element. That is to say, the dipole antenna (110) may be buried into the structure such that the dielectric layer is on the top of arms (112, 114) of the dipole antenna (110) and RF feed lines or a part of a feeding network may be in between the dipole antenna and the ground at the bottom (104) of the antenna module.

If the platform (102) is a PCB substrate, normal PCB-process may be used for cheap production of antenna modules, for example for large antenna arrays. The PCB substrate is a general term, which can be used for any suitable material than can be used when manufacturing (printed) circuit boards. For example, millimetre-wave platform technologies such as Low Temperature Co-fired Ceramics, LTCC, and thin-film substrates (quartz and silicon) may be used for electric connection of RF components. Furthermore, in some embodiments on-chip antenna technology may be utilized, e.g., at very high frequencies.

The distance between the bottom, i.e., the antenna ground (104), of the platform (102) and the dipole antenna (110) refers to a vertical distance. The expression "vertical" means a direction, which is perpendicular to the plane of the bottom (104) of the platform (102). The plane of the bottom or the antenna ground (104) of the platform (102) is denoted by x and y while the vertical direction is denoted by z in FIG. 1. The expression "horizontal" refers to a direction, which confirms with the plane of the bottom (104) of the platform (102).

The horizontal dipole antenna (110) further comprises a first arm (112) and a second arm (114), which may be referred to as branches of the dipole antenna (110) as well. The first arm (112) and the second arm (114) of the dipole antenna (110) may be referred to as conductive elements in general.

Antenna module (100) also comprises a pair of via holes. The pair of via holes comprises a first via hole (116) and a second via hole (118) extending through the platform (102), from the bottom (104) of the platform (102) to the dipole antenna (110), wherein the first via hole (116) is coupled to an RF feed (117) and to a first arm (112) of the dipole antenna (110) and the second via hole (118) is coupled to the ground at the bottom (104) of the platform (102) and to a second arm (114) of the dipole antenna (110).

Horizontal dipole antenna (110) is thus above the ground (104). The pair of via holes (116, 118) may be arranged to work as a balanced feed and as a balun for the dipole antenna (110). Alternatively, or in addition, the pair of via holes (116, 118) may be arranged to work as an impedance transformer for the dipole antenna (110).

The first via hole (116) and the second via hole (118) are separated by a distance from each other in horizontal direction such that a desired impedance of the dipole antenna (110) is generated, wherein the impedance of the dipole antenna (110) is observed at the bottom (104) of the platform (102) at the RF feed (117). The distance between the first via hole (116) and the second via hole (118) in horizontal direction may be adjusted to match a desired frequency of the millimetre-wave signal. Alternatively, or in addition, frequency adjustment may be performed by adjusting a length and/or width of the dipole antenna (110).

The impedance of the dipole antenna input (110) depends on several factors. As said, for proper via-balun operation, this distance (antenna height from ground) should anyway be close to a quarter-wave length inside the platform. A dielectric layer may be added on top of the top antenna layer (i.e., the dipole antenna 110) forming together platform (102). The first via hole (116) and the second via hole (118) preferably have symmetrical structures, for making manufacturing more efficient. For example, the radius of the first via hole (116) and the second via hole (118) may be the same so that the same drill can be used. The horizontal distance between the first via hole (116) and the second via hole (118) can be varied to adjust the impedance of the dipole antenna (110). That is to say, for instance the impedance of the dipole antenna (110) may be decreased by increasing the radius of the first via hole (116) and the second via hole (118), and vice versa. Alternatively, or in addition, the impedance of the dipole antenna (110) may be increased by increasing the distance between the via holes (116) and (118).

In typical case, but not always, the radius of the via holes (116, 118) is the same, not only as they can be drilled with one tool, but also as symmetry in antenna structure is preferred for obtaining symmetric radiation patterns. However, different diameters may be used as the via-holes are not radiating elements. Impedance tuning may be also done varying the distance of the bottom (104) of the platform (102) and the dipole antenna (110), i.e., the distance in a vertical direction (z-direction in FIG. 1), and vice versa when the via hole length is kept close to quarter wavelength. The length of via holes may correspond to the thickness of the platform (102).

Further, a dielectric layer in the antenna module (100), on top of the dipole antenna (110) can be used to find good matching range for the antenna and the impedance may depend on parameters of the dielectric layer material and thickness above the antenna. The dielectric layer may be an extra PCB layer for example. As for example, suitable dielectric materials with dielectric constant ($\varepsilon_r$) less than 4 could be Megtron7™ by Panasonic for multilayer structures and RT Duroid™ by Rogers Corporation. The dielectric layer, when applied above the antenna may be thin, for example one tenth of a quart length thickness, such as 50-150 μm.

Figure 2:
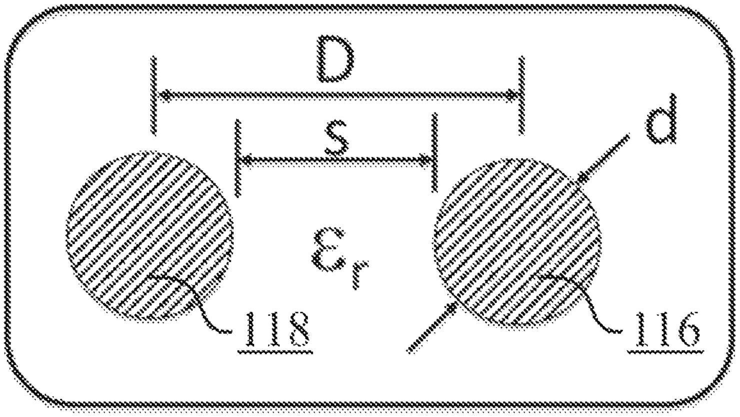
FIG. 2 illustrates an example of a pair of via holes in accordance with at least some embodiments of the present invention.

FIG. 2 illustrates an example of a pair of via holes in accordance with at least some embodiments of the present invention. At millimetre-wave frequencies the thickness of the platform, such as the PCB, and parameters of via holes (116, 118) are suitable for using via holes (116, 118) as balanced feed lines, e.g., for a printed dipole antenna. For instance, an antenna module (100) comprising the dipole antenna (110) printed on the PCB may be arranged such that the pair of via holes is used for balanced feeding.

When the thickness of the platform (102), not including the possible top layer, is about a quarter of a wavelength in the PCB substrate with dielectric of, e.g., a millimetre-wave signal, the second via hole (118) contacting the ground at the bottom (104) of the platform (102) is seen as open at the contacting dipole arm, i.e., the second arm (114) of the dipole antenna (110) in FIG. 1. The first via hole (116) may be contacted with RF-port between the first via hole (116) and the antenna ground (104). The RF port can be located on either side of the antenna ground (104) and can be extended to the transceiver for instance with a microstrip line using the antenna ground as the bottom layer (104). Thus, the pair of via holes (116, 118) is arranged to work as a balanced feed for the dipole antenna (110) of FIG. 1 while acting as a balun for the dipole antenna (110) as well. The structure is thus balanced and may be excited via an unbalanced transmission line, such as microstrip line.

According to some embodiments of the present invention, the dependencies between the parameters shown in FIG. 2 for via holes of equal diameter may be described using the following equation:

$$D = d * \cosh\left(\pi * \frac{z_0}{z_c} * sqrt(\varepsilon_r)\right), \tag{1}$$

wherein D denotes the distance from the center of the first via hole (116) to the center of the second via hole (118), d is the diameter of a circular via hole (116, 118), $z_c$ is the characteristic impedance, $z_0$ is the characteristic impedance of free space and $\varepsilon_r$ is the relative dielectric constant.

Figure 3:
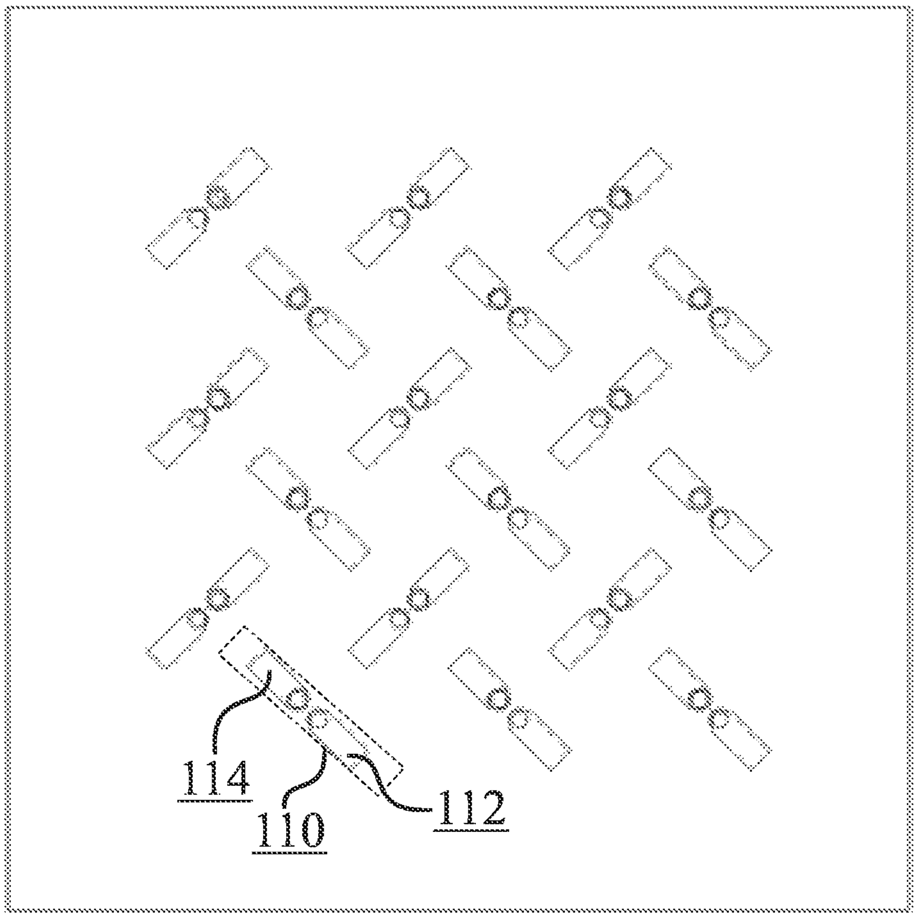
FIG. 3 illustrates a first example of an antenna array in accordance with at least some embodiments of the present invention.

FIG. 3 illustrates an antenna array in accordance with at least some embodiments of the present invention. Antenna array of FIG. 3 is an example of a dual polarized array making use of linear polarized dipoles shown in FIG. 1.

Figure 4:
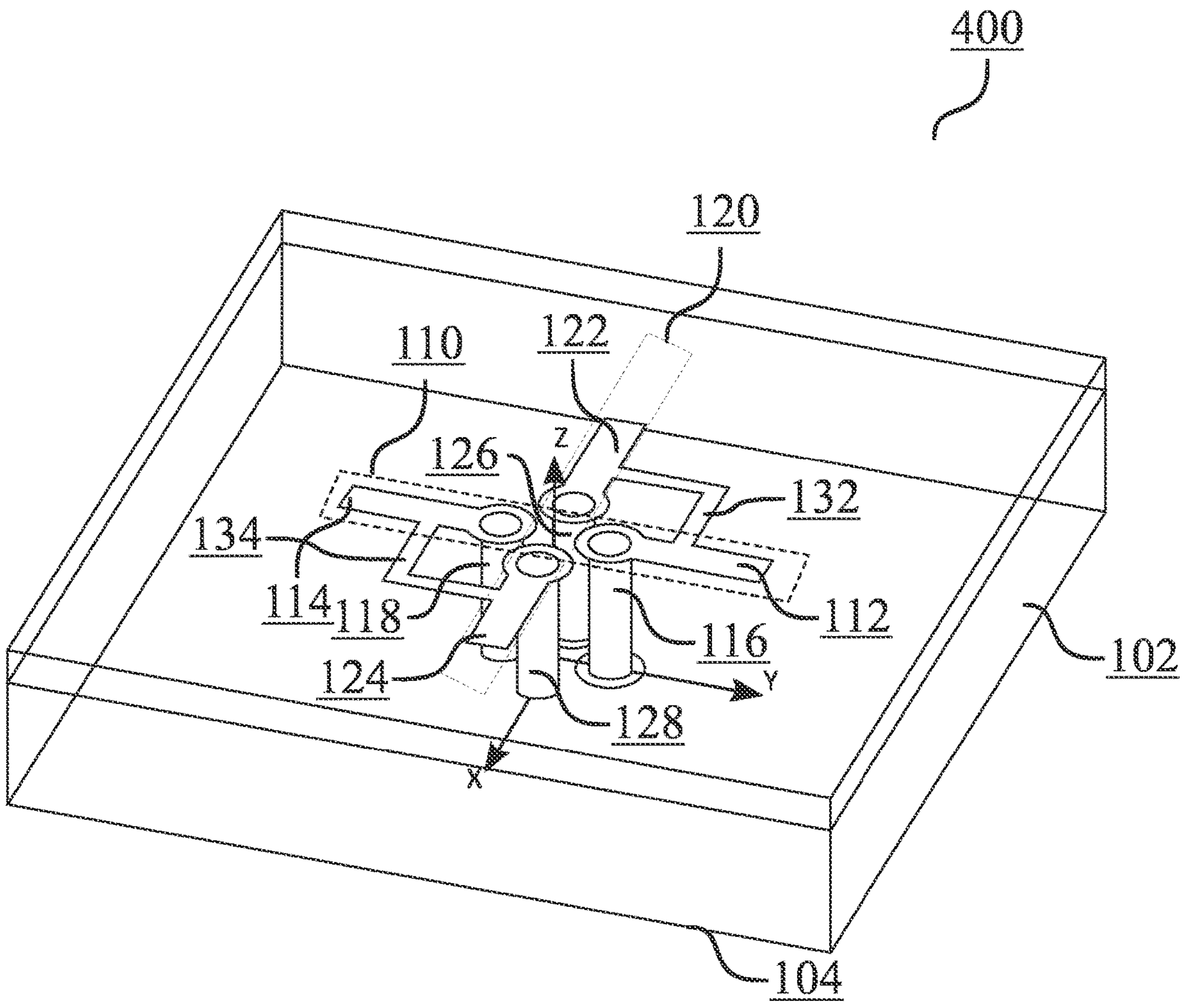
FIG. 4 illustrates a second example of an antenna module in accordance with at least some embodiments of the present invention.

FIG. 4 illustrates a second example of an antenna module in accordance with at least some embodiments of the present invention. The antenna module (400) of FIG. 4 comprises two dipole antennas, the dipole antenna (110) of FIG. 1 and another similar dipole antenna (120). Said another dipole antenna (120) further comprises a first arm (122) and a second arm (124). Said two dipole antennas (110, 120) may form a crossed dipole antenna over ground. The antenna module (400) of FIG. 4 may be arranged to provide circular polarization with 90 degree phase shift. The width, length and contacting positions of the arms (112, 114, 122. 124) of the dipole antennas (110, 120) are parameters affecting both antenna matching and polarization axial ratio. With proper choice of parameters, good port isolation and polarization axial ratio may be obtained.

The antenna module (400) of FIG. 4 comprises all the parts of the antenna module (100) of FIG. 1. In addition, the antenna module (400) comprises another pair of via holes, wherein said another pair of via holes further comprises a third via hole (126) and a fourth via hole (128) extending through the platform (102), from the bottom (104) of the platform (102) to said another dipole antenna (120) on top of, or buried in, the platform (102), wherein the third via hole (126) is coupled to another RF feed and to the first arm (122) of said another dipole antenna (120) and the fourth via hole (128) is coupled to the ground at the bottom (104) of the platform (102) and to a second arm (124) of said another dipole antenna (120) perpendicular to dipole antenna (110) forming a crossed dipole structure. The ground at the bottom (104) of the platform (102) and said another RF feed correspond to the ground, i.e., the bottom (104), and the RF feed (117) of FIG. 1, but are not shown in FIG. 4 for the sake of clarity.

In some embodiments, the dipole antenna (110) and said another dipole antenna (120) may be arranged to generate signals with opposite polarizations simultaneously, said opposite polarizations comprising LHCP and RHCP, thereby enhancing communication capacity. Alternatively, the dipole antenna (110) and said another dipole antenna (102) may be arranged to generate signals with opposite polarizations at different times in a pseudorandom way, thereby improving security.

In the example of FIG. 4 the 90 degree phase shift is obtained by using the first connecting line (132) between the first arm (112) of the dipole antenna (110) and the first arm (122) of said another dipole antenna (120) and the second connecting line (134) between the second arm (114) of the dipole antenna (110) and the second arm (124) of said another dipole antenna (120). Again, via holes (116, 118, 126, 128) may be used as impedance transformers. The first via holes (116, 126) are used as RF feeds while the second via holes (118, 128) are RF grounds. The first via hole (116) of the dipole antenna (110) may be coupled to a first port and the first via hole (126) of said another dipole antenna (120) may be coupled to a second port. Dipole phase difference is 90 degrees for circular polarization and tuned with the connecting lines (132, 134) to optimum. Here, a connecting line refers to a line which transfers power (half of the power)

of the feeding dipole to the other dipole and causes the desired phase shift to the transferred signal.

Circular polarization is provided by arranging the connecting lines (132, 134) so that the first connecting line (132) lets current flow from the first via hole (116) of the first arm (112) of the dipole antenna (110) to the first arm (122) of said another dipole antenna (120) with 90 degree phase shift, thereby making the antenna circularly polarized. That is to say, when the first port is excited, the first connecting line (132) lets current flow from the first via hole (116) of the dipole antenna (110) to excite said another dipole antenna (120) with 90 degree phase shift. Opposite polarization is obtained when the second port connected to the first arm (122) of the dipole antenna (120) is excited. Thus, connecting lines (132, 134) between arms of the dipole antennas may be arranged to provide the 90 degree phase shift, but in opposite polarization compared to the case with the first port excitation. Both RF-ports (116) and (126) are isolated in this configuration.

If only one type of circular polarization (LHCP or RHCP) is enough for the communication system, only one pair of via holes is needed, the other pair can either be omitted from the structure or left unused. That is to say, when the antenna module (400) is arranged to generate one-handed circular polarization using only the two via holes of a feeding dipole antenna, like the dipole antenna (110), the via holes of the other dipole antenna, like said another dipole antenna (120), may be omitted, shorted to ground (104), left open or matched to load, as feeding ports of the dipoles antennas (110, 120) are RF-isolated.

The length of the connecting lines (132, 134) may be tuned such that a signal may be induced from the dipole antenna (110) to said another dipole antenna (120) with 90 degree phase difference and said two connecting lines (132, 134) are identical at length, width and contact points at the two dipoles connecting opposite dipole arms together, i.e., have 180 degree rotational symmetry around the crossed dipole axis. When the connecting lines (132, 134) are moved towards the end of the dipoles, the length of the line increases and consequently the phase shift between the two dipole antennas increases. When the phase difference is 90 degrees, circular polarization is obtained. This tuning affects antenna impedance matching, and has to be compensated with feed geometry adjustment, e.g. by adjusting the via hole geometry in FIG. 2.

Figure 5A:
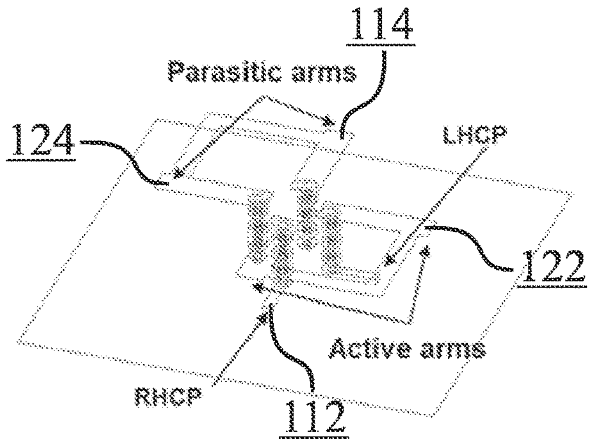
FIG. 5A illustrates the second antenna module with LHCP and RHCP ports in accordance with at least some embodiments of the present invention.

FIG. 5A illustrates the second antenna module with LHCP and RHCP ports in accordance with at least some embodiments of the present invention. Two opposite circular polarizations are obtained simultaneously as depending of the excited port, the signal along the connecting lines is flowing into opposite directions.

Figure 5B:
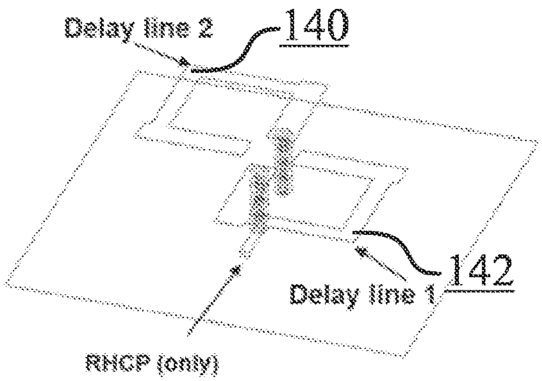
FIG. 5B illustrates the second antenna module with RHCP only in accordance with at least some embodiments of the present invention.

FIG. 5B illustrates the second antenna module with RHCP only in accordance with at least some embodiments of the present invention. In FIG. 5B, delay lines (140, 142) are shown. As shown in FIG. 5B, in some embodiments, only the two via holes of the excited dipole are needed as the other dipole feed is originally isolated.

Figure 5C:
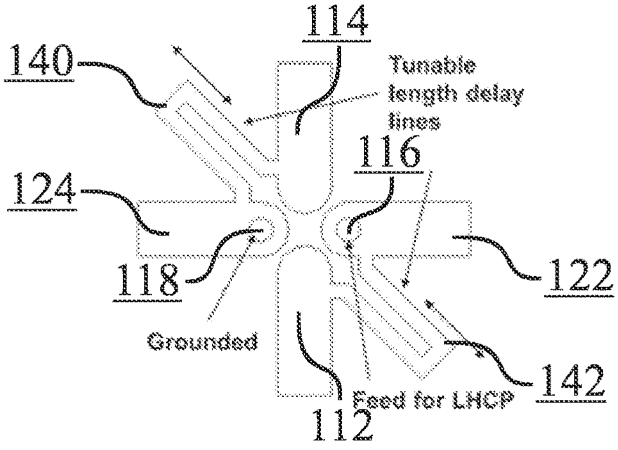
FIG. 5C illustrates a tunable delay line in accordance with at least some embodiments of the present invention.

FIG. 5C illustrates a tunable delay line in accordance with at least some embodiments of the present invention. The connection line is here called delay line, as the line length is proportional to the signal delay (phase shift) between the two connecting points. When the delay line connection points are fixed, the length of the delay lines (140, 142) may be varied with a connecting line geometry such as in FIG. 5C, where the line position may be fixed and the line extension stub length may be varied. Thus, the phase shift may be tuned to 90 degrees by adjusting the length of the delay lines (140, 142).

Figure 6:
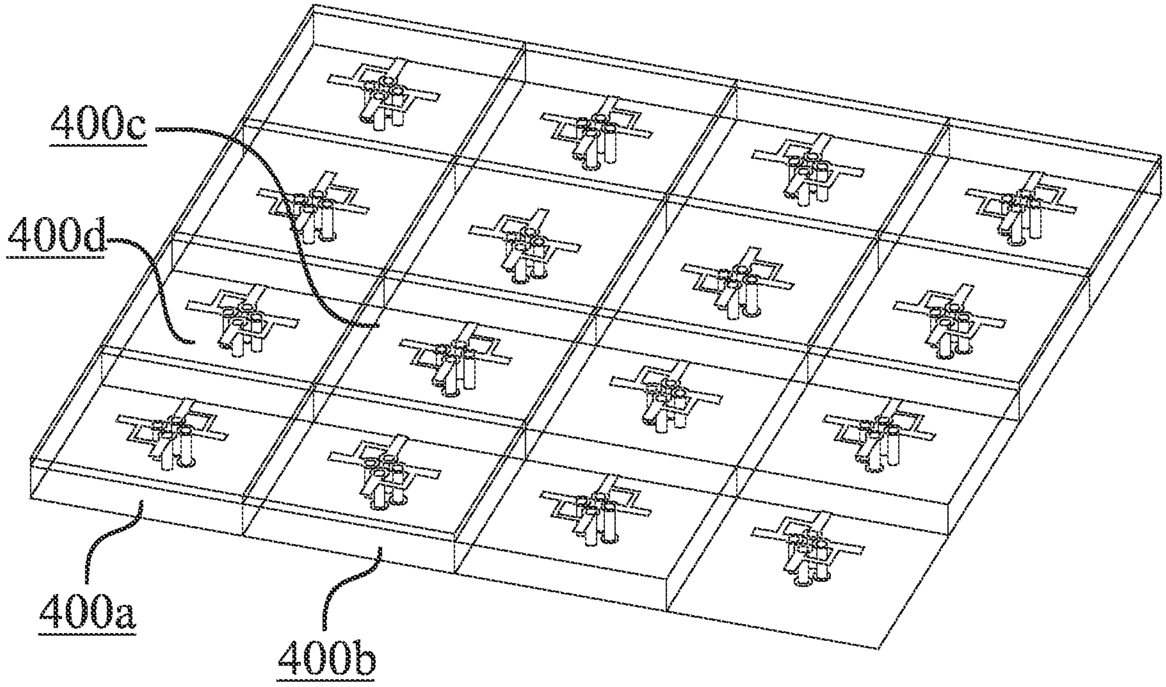
FIG. 6 illustrates a second example of an antenna array in accordance with at least some embodiments of the present invention.

FIG. 6 illustrates an example of an antenna array in accordance with at least some embodiments of the present invention. An antenna array of FIG. 6 comprises multiple antenna modules (400*a*, 400*b*, 400*c* . . . ) according to the embodiments of the example of FIG. 4. In the antenna array, subsequent antenna modules are sequentially rotated by 90 degrees with respect to each other in 2×2 antenna module groups. That is to say, a second antenna module (400*b*) may be rotated by 90 degrees compared to a first antenna module (400*a*), and a third antenna module (400*c*) may be rotated by 90 degrees compared to a second antenna module (400*b*), the fourth antenna module (400*d*) may be rotated by 90 degrees compared to the third antenna module (400*c*). Subgroups of four antenna modules can be further copied to form bigger antenna arrays as in FIG. 6. Sequential 90 degree antenna module rotation is therefore provided for improved radiation pattern symmetry, to enhance performance of the antenna array.

Figure 7:
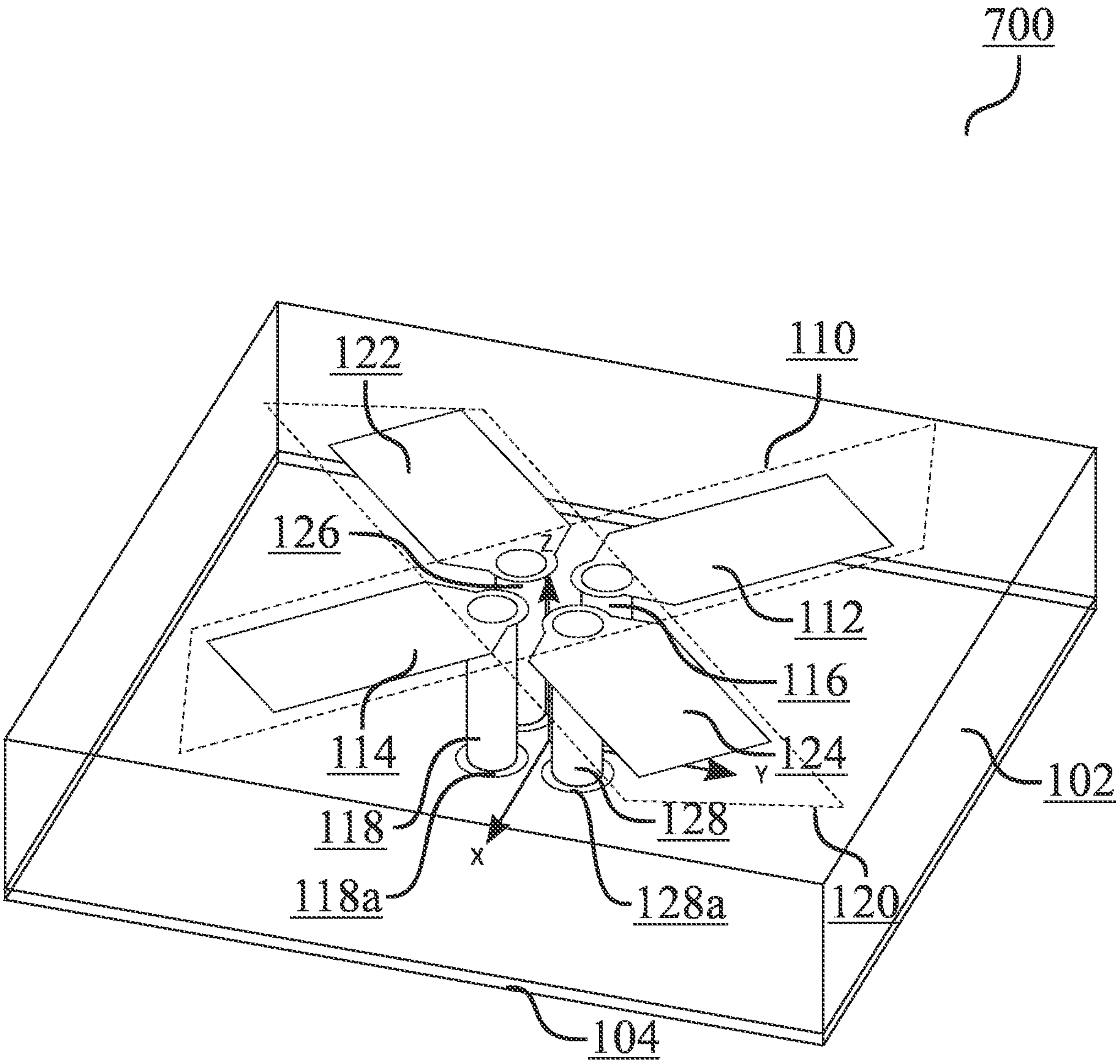
FIG. 7 illustrates a third example of an antenna module in accordance with at least some embodiments of the present invention.

FIG. 7 illustrates a third example of an antenna module in accordance with at least some embodiments of the present invention. FIG. 7 illustrates an antenna module (700) which corresponds to the antenna module (400) shown in FIG. 4, but the antenna module (700) does not comprise connecting lines. Instead, the antenna module (700) of FIG. 7 may be arranged to provide circular polarization with 90 degree phase shift at RF-feeds (118*a*) and (128*a*).

Figure 8:
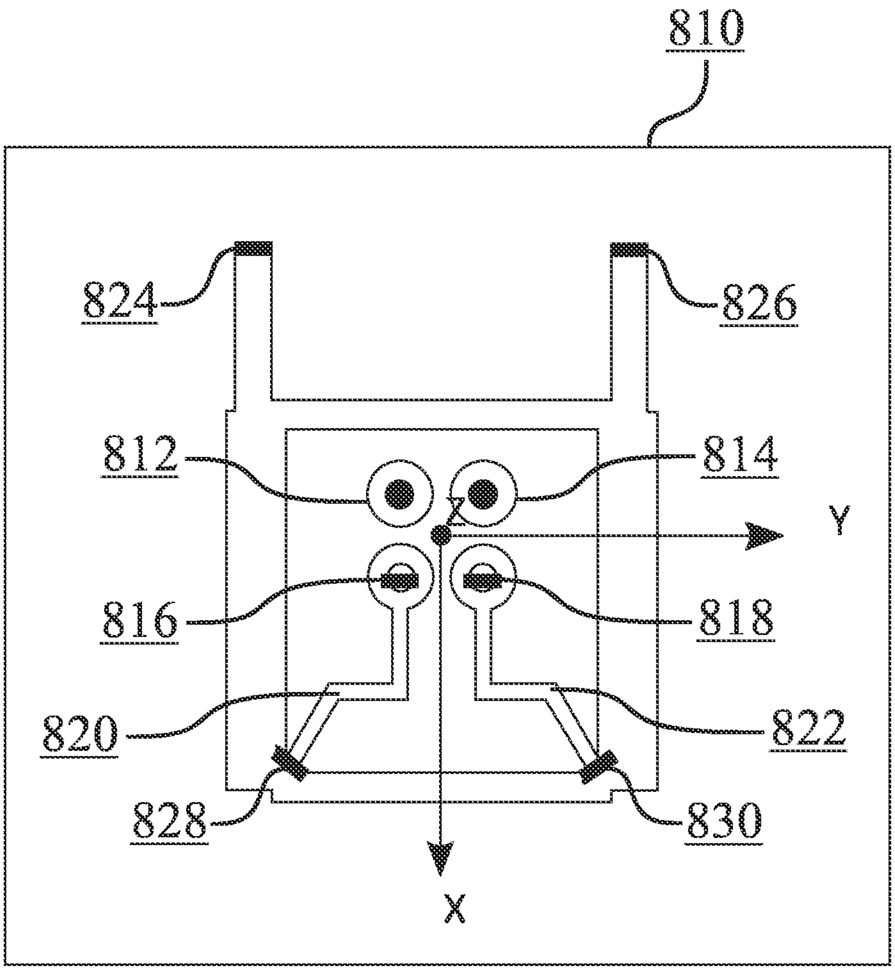
FIG. 8 illustrates hybrid 3 dB 90 degree phase shifter in accordance with at least some embodiments of the present invention.

FIG. 8 illustrates an example of a circuit in accordance with at least some embodiments of the present invention. More specifically, FIG. 8 illustrates the hybrid coupler circuit (810). In FIG. 8, via hole (812) may be the second via hole (118) of the first dipole antenna (110) and via hole (814) may be the second via hole (128) of said another dipole antenna (120), respectively. Pads (816, 818) may be pads for dipole feeds, i.e., for the first via hole (116) of the first dipole antenna (110) and the first via hole (126) of said another dipole antenna (120).

The circuit (810) may be a 3 dB/90 deg hybrid power splitter for example. Connections (820, 822) connect the circuit (810) to the dipole feed connections/pads (816, 818) at the first via holes (116, 126). The structure of the circuit (810) is compact and therefore a compact antenna module comprising the circuit (810) can be provided as well.

In some embodiments, pads (816, 818) may be coupled to antenna feeds, i.e., the feeds may be connected directly to via holes (116, 126) in FIG. 7. When the signal is fed to one of the RF ports (824) or (826), the signal is split to two equal signals with 90 degree phase shift to ports (816) and (818). The phase shift is +/−90 degrees depending which of the ports (824) or (826) is fed. Thus circular polarizations for LHCP and RHCP antenna operation is obtained depending which of the ports (824) or (826) is used as feed. The hybrid circuit thus proves separate ports for LHCP and RHCP polarizations. The circuit (810) may be at the bottom (104) of the platform (102) and the first via hole (116) of the dipole antenna (110) may be coupled to the first port (824) and to the second port (826) with 90 degree phase delay compared to port (824). Likewise the first via hole (126) of said another dipole antenna (120) may be coupled to the second port (826) and to the second port (826) with 90 degree phase delay compared to port (824).

Figure 9:
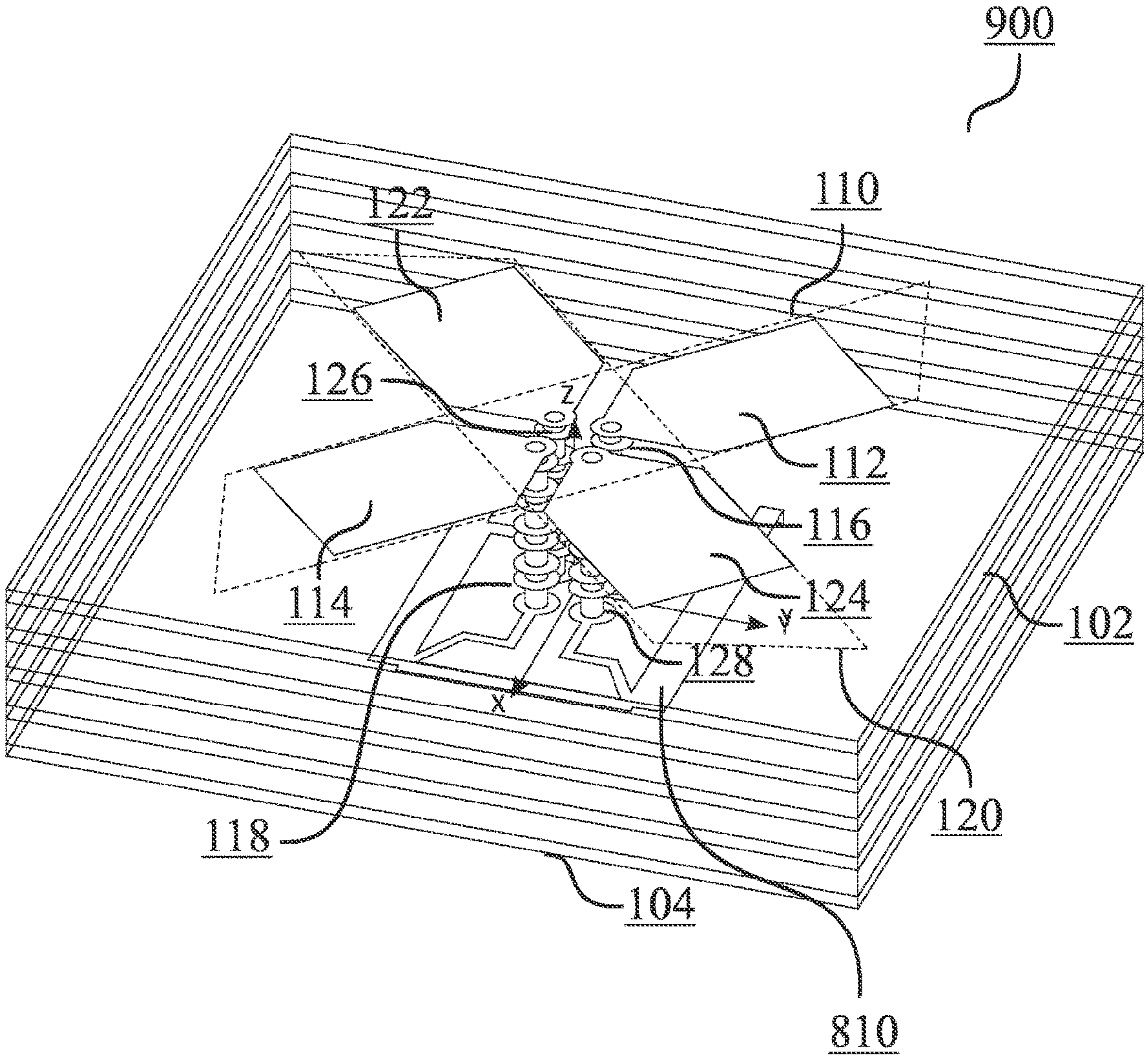
FIG. 9 illustrates a fourth example of an antenna module in accordance with at least some embodiments of the present invention.

The first port (824) may provide right hand circular polarization (RHCP) and the second port (826) may provide left hand circular polarization (LHCP). The first port (824) and the second port (826) may be used simultaneously. In some embodiments, the hybrid coupling circuit (810) may be made compact by placing the dipole antenna (110), and possibly said another dipole antenna (120), with the via holes on top of the hybrid circuit (810) so that edges of the dipole antenna(s) and the antenna module (100) fit within edges of the circuit (810) as shown in FIGS. 8, 9 and 10.

Alternatively, or in addition, the hybrid circuit (810) may be on a PCB-layer which shares a common ground with the antenna ground on the bottom (104) of the platform (102). This PCB-layer either may be under the bottom (104) of the platform (102) or above the bottom (104) on stacked antenna structure, i.e. buried inside the platform (102). The hybrid circuit (810) can thus be integrated with the antenna and manufactured with same process without occupying extra space.

So the circuit (810) makes use of a branch line coupler with feeding ports defined as (824, 826) and ports with 90 degree phase difference as (828, 830). Further, port (828) is connected to port (816) and, port (830) is connected to port (818) with transmission lines (820, 822) turned inside the circuit (810) to make contact with the via holes, i.e., the first via hole (118) of the first dipole antenna (110) and the first via hole (128) of said another dipole antenna (120). As the transmission lines (820, 822) can be turned inside the circuit (810), the structure is compact enough to be inserted to an antenna module. A transmission line is a line which transfers power only, but does not cause a phase shift.

The architecture shown in FIG. 8 suites particularly well for stacked PCB-layers, wherein small via-holes may be drilled with laser and a compact branch coupler is integrated on the bottom layer of the stack. In some embodiments, width of the transmission lines (820, 822) may be used as part of system impedance matching either as a (near) quarter wave impedance transformer or as a more complex microstrip matching circuit combined of connection line and stubs.

FIG. 9 illustrates a fourth example of an antenna module in accordance with at least some embodiments of the present invention. Antenna module (900) of FIG. comprises stacked substrates, i.e., the platform (102) of antenna module (900) has a stacked multi-level structure. In general, the stacked multi-level structure may be used in all embodiments of the present invention to provide easy implementation of small via holes (116, 118, 126, 128). In addition, a circuit (810) is shown. The circuit (810) may be referred to as a hybrid coupler, i.e 3 dB power splitter with 90 degree phase shift branches. The circuit (810) may be on the bottom layer (104) of the platform (102).

Figure 10A:
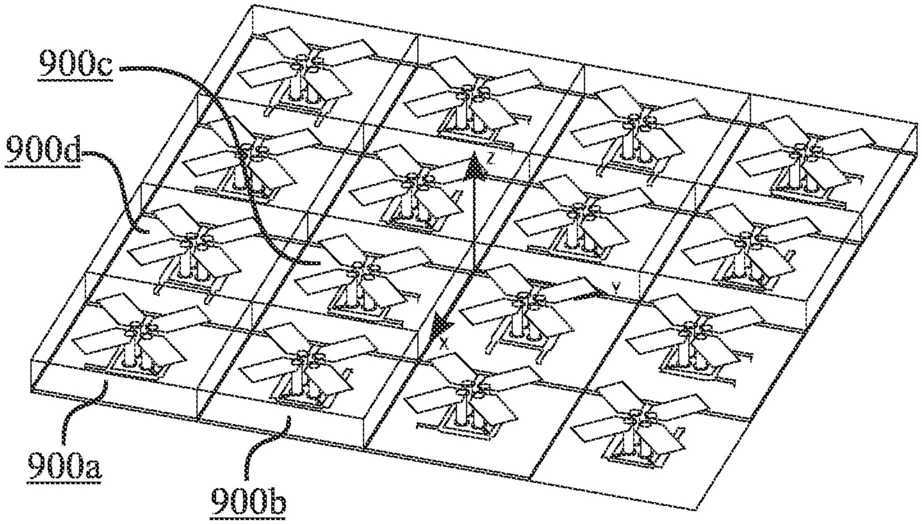
FIG. 10A illustrates a third of an antenna array in accordance with at least some embodiments of the present invention.

FIG. 10A illustrates a second example of an antenna array in accordance with at least some embodiments of the present invention. An antenna array of FIG. 10A comprises multiple antenna modules (900*a*, 900*b*, 900*c*, 900*d*) according to the embodiments of the example of FIG. 9. In the antenna array subsequent antenna modules are sequentially rotated by 90 degrees with respect to each other in subgroups of 2×2 antenna modules similarly as in FIG. 6.

Figure 10B:
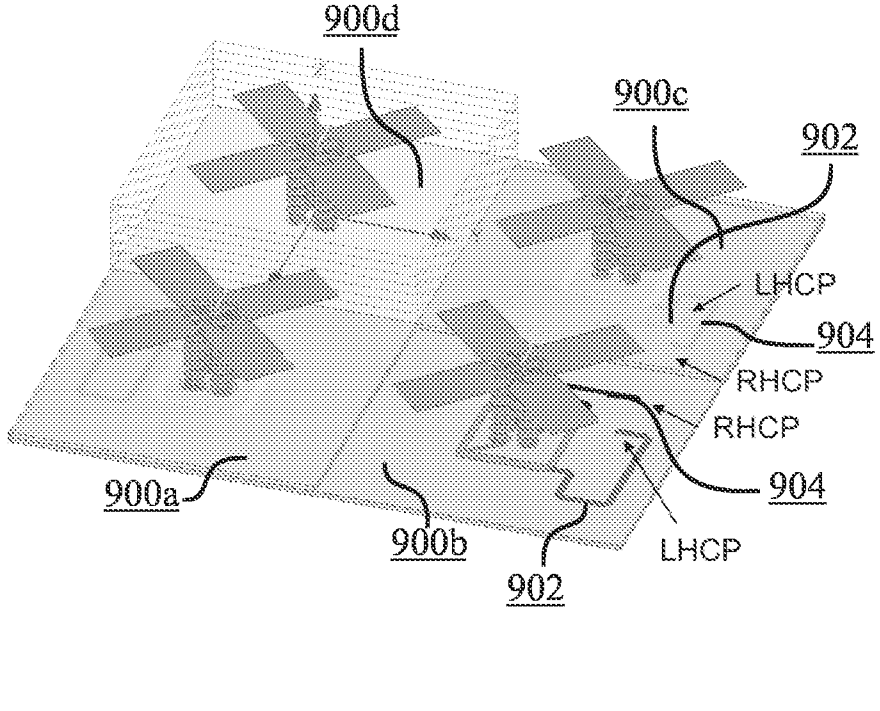
FIG. 10B illustrates sequential rotation of a 2*2 antenna array with phase compensating delay lines for LHCP and RHCP.

FIG. 10B illustrates sequential rotation of a 2*2 antenna array with phase compensating delay lines for LHCP and RHCP. Delay line for LHCP is denoted by 902 and delay line for RHCP is denoted by 904. The delay lines in general merely compensate for the phase shift caused by the rotation but do not transfer power from one dipole antenna to another like connecting lines. The antenna array may be arranged to compensate 90 degree phase difference between the subsequent antenna modules caused by said sequential rotation of 90 degrees, to recover the desired antenna pattern and polarization. This compensation can be made either with digital/analog phase shifters on component layer under the platform (102) or by using 0, 90, 180 and 270 degree long delay lines (902, 904) at operation frequency. These delay lines (902, 904) may be printed under the platform (102) or on one layer of the antenna stack forming the platform (102), thus forming one integrated structure with one PCB-process.

Figure 11:
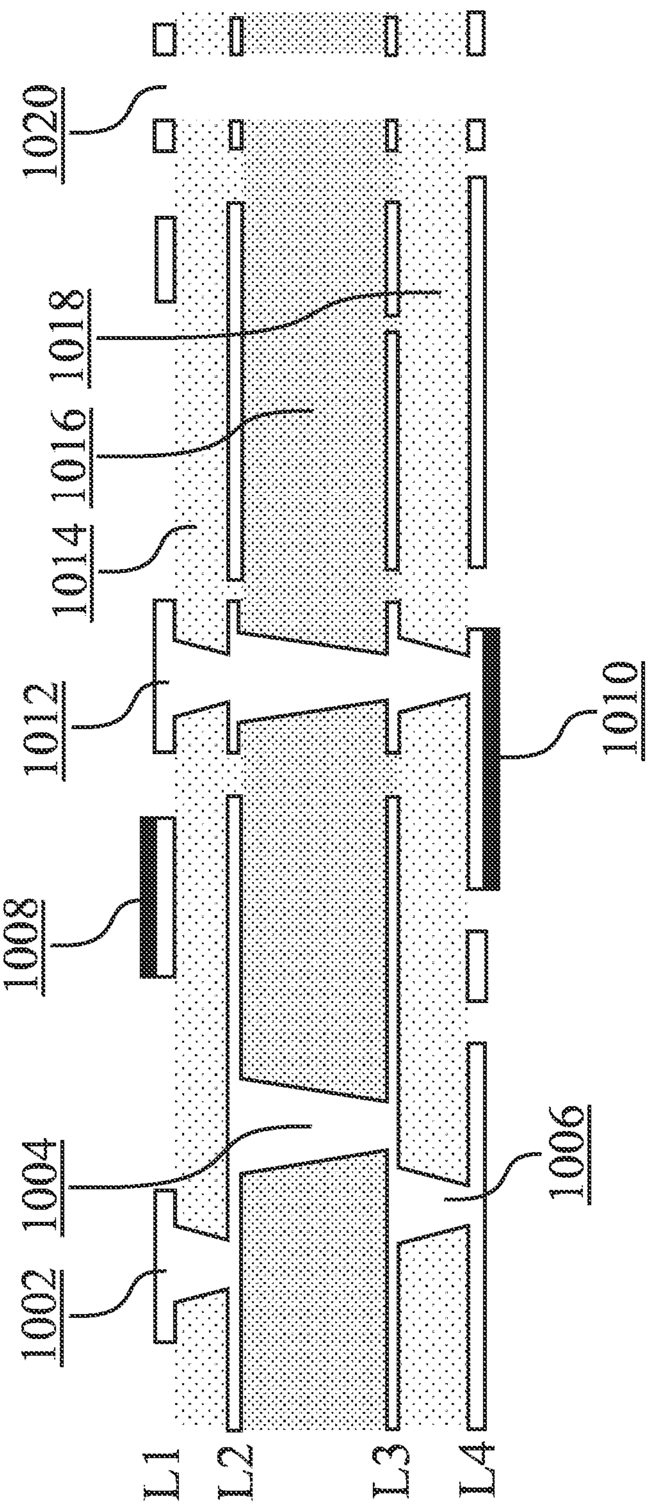
FIG. 11 illustrates a first example of a stacked platform in accordance with at least some embodiments of the present invention.

FIG. 11 illustrates a first example of a stacked platform in accordance with at least some embodiments of the present invention. The stacked platform may be a stacked PCB platform composed of a thick core substrate and two thinner (prepreg) substrates symmetrically on both sides of the core. The stacked platform has a multi-level structure, with four metal layers denoted by L1, L2, L3 and L4. Via holes connecting the layers can be used in manufacturing. For instance, layer 1 (L1) can be component layer for digital phase shifters, phase forming MMICs, hybrid couplers, power distribution lines etc. Layer 2 (L2) is ground layer for component layer and layer 3 (L3). The antenna modules may be located on layer 3 (L3) or layer 4 (L4) depending on the antenna design. If antenna is on layer 3 (L3), layer 4 (L4) is empty and the prepreg substrate is used as cover layer, or radom for the antenna. If antenna is on layer 4 (L4), layer 3 (L3) is empty of metal but for the connection pads contacting antenna via holes, say (1004) to (1006). Antenna feed vias like (1012) extend from layer (L1) to antenna layer (L4) or (L3) if radom is used. Antenna ground vias extend from ground layer 2 (L2) to antenna layer (L4) or (L3).

In FIG. 11, a via hole between L1 and L2 (80 μm) is denoted by (1002), a via hole between L2 and L3 (100 μm) is denoted by (1004) and a via hole between L3 and L4 (80 μm) is denoted by (1006). Soldermasks (25 μm) are denoted by (1008) and (1010). A via hole between L1 and L4 is denoted by (1012). First prepreg (64 μm) is denoted by (1014), core (127 μm) is denoted by (1016) and second prepreg (64 μm) is denoted by (1018). Non-plated via is denoted by (1020). For example, the hybrid circuit (810) in FIG. 8 may be on the first layer of the platform, i.e., on L1 while antenna is located on L3 or L4. The dimensions in brackets are given just for the matter of example and minimum dimensions used in manufacturing process are important design parameters.

It is common, that a via hole diameter has to be in order of the substrate thickness at minimum for reliable hole plating (copper filling). As antenna structure is generally thick, the core layer (1016) thickness should be of the order of the via hole diameter used in antenna design. Say, a 1 mm thick antenna-ground separation with 100 μm via holes would require one core layer of 100 μm thickness and 9 prepreg layers of same thickness. The antenna vias may have to extend through all these layers and need connection pads in between to make contact with the via holes between different layers.

In some embodiments, these "extra" layers can be used as a part of the component layer when RF-bridges with crossing RF-lines such as for RF distribution net are needed. Also the hybrid coupler circuit (810) can be manufactured on the opposite side of the ground plane under the component layer.

However, for cost efficient manufacturing unnecessary layers should be avoided. Thick substrates with thin via holes up to 1/10 via hole diameters to substrate thicknesses ratio can be manufactured using anode plate and pulse reverse plating technology.

Figure 12:
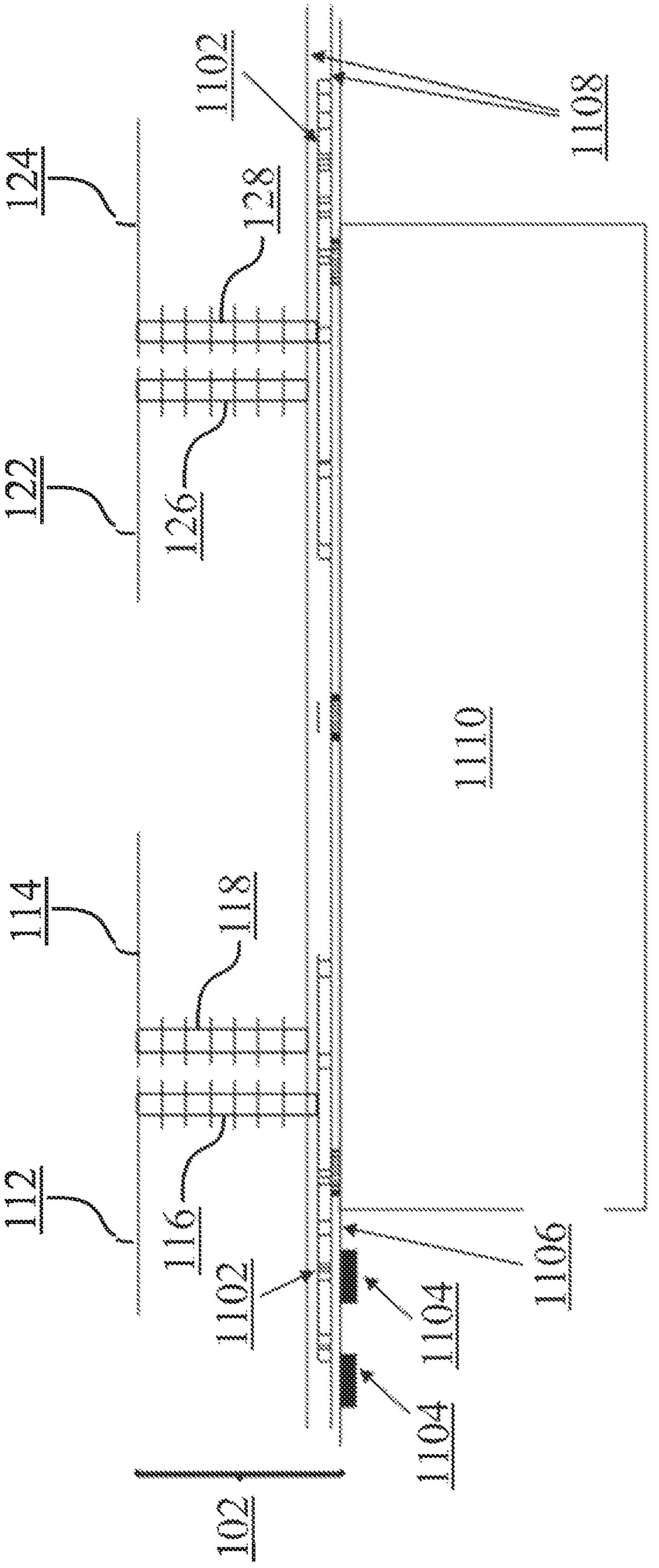
FIG. 12 illustrates a second example of a stacked platform in accordance with at least some embodiments of the present invention.

FIG. 12 illustrates a second example of a stacked platform in accordance with at least some embodiments of the present invention. On top of the platform are shown two dipole antennas (which can also be crossed dipoles as a side view) with dipole arms (112, 114, 122, 124) with via holes (116,

118, 126, 128). In addition, hybrids, phasing lines (1102), discrete RF components (1104), RF distribution net (1106) ground (1108) and MMIC (1110) are illustrated as well. In FIG. 12 is shown an arrangement, where the digital beam-former MMIC component (1110) (phase and amplitude control) is placed under the antenna array.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths and widths as electrical dimensions (i.e., as a function of a used wavelength), shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in wireless communication networks. Examples of wireless communication networks comprise 5G/NR, WLAN and satellite communication networks.

ACRONYMS LIST

3GPP 3rd Generation Partnership Project
5G 5$^{th}$ Generation
HAPS High Altitude Platform Station
LEO Low Earth Orbit
LTCC Low Temperature Co-fired Ceramics
LTE Long Term Evolution
MIMO Multiple-Input Multiple-Output
NATO North Atlantic Treaty Organization
NR New Radio
PCB Printed Circuit Board
RAT Radio Access Technology
RF Radio Frequency
SPDT Single Pole Double Throw
UE User Equipment
WLAN Wireless Local Area Network

REFERENCE SIGNS LIST

100, 400, 700, 900 Antenna module
102 Platform
104 Bottom of the platform
110, 120 Dipole antenna
112, 114, 122, 124 Arms of dipole antennas
116, 118, 126, 128, 812, 814, 1002, 1004, 1006, 1012 via holes
117 RF feed
132, 134 Connecting lines
140, 142, 902, 904 Delay lines
810 Circuit
816, 818 Pads for dipole feeds
820, 822 Transmission lines
824, 826, 828, 830 Ports
1008, 1010 Soldermasks
1014, 1016, 1018 Prepregs—(pre-impregnated material holding core materials together)
1020 Non-plated via
1102 phasing lines
1104 discrete RF components
1106 RF distribution net
1108 ground
1110 MMIC

The invention claimed is:

1. An antenna module, comprising:
a Radio Frequency, RF, component electrical connection platform;
a dipole antenna on top of, or buried in, the platform, wherein the dipole antenna is arranged to transmit and/or receive an RF signal and a distance between a ground at a bottom of the platform and arms of the dipole antenna is about a quarter of a wavelength of the RF signal; and
a pair of via holes comprising a first via hole and a second via hole extending through the platform, from the ground of the platform to the arms of the dipole antenna, wherein the first via hole is coupled to an RF feed and to a first arm of the dipole antenna and the second via hole is coupled to the ground at the bottom of the platform and to a second arm of the dipole antenna, wherein the antenna module further comprises another dipole antenna with 90 degrees rotational symmetry compared to the dipole antenna to form a crossed dipole structure, wherein said another dipole antenna comprises another pair of via holes, said another pair of via holes comprising a third via hole and a fourth via hole extending through the platform, from the ground at the bottom of the platform to arms of said another dipole antenna, wherein the third via hole is coupled to the ground at the bottom of the platform and to a first arm of said another dipole antenna, and the fourth via hole is coupled to another RF feed and to a second arm of said another dipole antenna, and wherein the antenna module is arranged to generate opposite handed circular polarization, where polarization direction depends on which of the two dipole antennas is a feeding dipole antenna or the antenna module is arranged to generate one-handed circular polarization using only feeding and shorting the via holes of the feeding dipole antenna and omitting, shorting, leaving open or matching to load the via holes of the dipole antenna that is not used as the feeding dipole antenna.

2. The antenna module according to claim 1, wherein the pair of via holes is arranged to work as a balanced feed and as a balun for the dipole antenna.

3. The antenna module according to claim 1, wherein the first via hole and the second via hole are arranged at a distance from each other such that a desired impedance of the dipole antenna is generated, wherein the impedance of the dipole antenna is observed at the bottom of the platform at the RF feed.

4. The antenna module according to claim 1, wherein a radius of the first via hole and the second via hole is selected to get a desired impedance of the dipole antenna.

5. The antenna module according to claim 1 having a stacked multi-level structure, wherein the dipole antenna is buried into the structure such that a dielectric layer is on the top of the arms of the dipole antenna and RF feed lines or a part of a feeding network is in between the dipole antenna and the ground at the bottom of the antenna module.

6. The antenna module according to claim 1, wherein the dipole antenna and said another dipole antenna are arranged to generate signals with opposite circular polarizations simultaneously or the dipole antenna and said another dipole antenna are arranged to generate signals with said opposite circular polarizations at different times in a pseudorandom way, said opposite polarizations comprising left handed circular polarization and right handed circular polarization.

7. The antenna module according to claim 1, wherein the antenna module is a crossed dipole element and the pair of via holes is arranged to generate a RF signal for the dipole antenna with a phase difference of +/−90 degrees compared to a RF signal coupled to said another dipole antenna from one RF source.

8. The antenna module according to claim 7, further comprising a first delay line between the first arm of the dipole antenna and the first arm of said another dipole antenna and a second delay line between the second arm of the first dipole antenna and the second arm of said another dipole antenna, wherein lengths of said first and second delays lines are arranged such that said +/−90 degree phase difference is generated between the two dipole antennas.

9. The antenna module according to claim 7, further comprising a 3 dB 90° hybrid couplers circuit at the bottom of the platform, the hybrid circuit comprising two antenna feed connection ports with 90 degree phase difference, a first port and a second port, wherein the first via hole of the dipole antenna is coupled to the first port and the first via hole of said another dipole antenna is coupled to the second port, and the first port is arranged to feed a signal with 90 degree phase difference compared to a signal fed by the second port for circular polarization to generate said +/−90 degree phase difference, wherein the hybrid circuit is on the platform around the first via hole and the second via hole, and the circuit shares a common ground with the antenna ground on the bottom of the platform.

10. The antenna module according to claim 1, wherein the platform is a Printed Circuit Board, PCB, substrate.

11. An antenna array comprising multiple antenna modules according to claim 1.

12. The antenna array according to claim 11, wherein neighboring antenna modules are sequentially rotated by 90 degrees with respect to each other, and wherein the phase differences due to rotation between the neighboring antenna modules are compensated with 90, 180 and 270 degree long delay lines for each 2×2 antenna module sub-array, to recover the desired antenna pattern and polarization.

13. The antenna array according to claim 12, wherein said neighboring antenna modules are crossed dipoles.

14. A wireless device comprising an antenna array according to claim 11.

15. An antenna module, comprising:

a Radio Frequency, RF, component electrical connection platform;

a dipole antenna on top of, or buried in, the platform, wherein the dipole antenna is arranged to transmit and/or receive an RF signal and a distance between a ground at a bottom of the platform and arms of the dipole antenna is about a quarter of a wavelength of the RF signal; and a pair of via holes comprising a first via hole and a second via hole extending through the platform, from the ground of the platform to the arms of the dipole antenna, wherein the first via hole is coupled to an RF feed and to a first arm of the dipole antenna and the second via hole is coupled to the ground at the bottom of the platform and to a second arm of the dipole antenna, wherein the antenna module further comprises another dipole antenna with 90 degrees rotational symmetry compared to the dipole antenna to form a crossed dipole structure, wherein said another dipole antenna comprises another pair of via holes, said another pair of via holes comprising a third via hole and a fourth via hole extending through the platform, from the ground at the bottom of the platform to arms of said another dipole antenna, wherein the third via hole is coupled to the ground at the bottom of the platform and to a first arm of said another dipole antenna, and the fourth via hole is coupled to another RF feed and to a second arm of said another dipole antenna, wherein the antenna module is a crossed dipole element and the pair of via holes is arranged to generate a RF signal for the dipole antenna with a phase difference of +/−90 degrees compared to a RF signal coupled to said another dipole antenna from one RF source, wherein the antenna module further comprises a first delay line between the first arm of the dipole antenna and the first arm of said another dipole antenna and a second delay line between the second arm of the first dipole antenna and the second arm of said another dipole antenna, and wherein lengths of said first and second delays lines are arranged such that said +/−90 degree phase difference is generated between the two dipole antennas.

* * * * *